United States Patent
Smith (10) Patent No.: US 10,461,443 B2
(45) Date of Patent: Oct. 29, 2019

(54) SPLIT GROUNDING BUSHING WITH REMOVABLE SPACER

(71) Applicant: Bridgeport Fittings, LLC, Stratford, CT (US)

(72) Inventor: Lawrence J. Smith, Stamford, CT (US)

(73) Assignee: Bridgeport Fittings, LLC, Stratford, CT (US)

(*) Notice: Subject to any disclaimer, the term of this patent is extended or adjusted under 35 U.S.C. 154(b) by 0 days.

(21) Appl. No.: 15/884,580

(22) Filed: Jan. 31, 2018

(65) Prior Publication Data

US 2018/0323518 A1 Nov. 8, 2018

Related U.S. Application Data

(63) Continuation-in-part of application No. 15/584,547, filed on May 2, 2017, now abandoned.

(51) Int. Cl.
| | |
|---|---|
| *H02G 3/18* | (2006.01) |
| *H01R 4/30* | (2006.01) |
| *H01R 4/64* | (2006.01) |
| *H01R 4/22* | (2006.01) |
| *H01R 4/32* | (2006.01) |
| *H01R 4/36* | (2006.01) |
| *H01R 4/60* | (2006.01) |
| *H02G 3/06* | (2006.01) |
| *H01R 13/655* | (2006.01) |

(52) U.S. Cl.
CPC ............... *H01R 4/304* (2013.01); *H01R 4/22* (2013.01); *H01R 4/32* (2013.01); *H01R 4/36* (2013.01); *H01R 4/60* (2013.01); *H01R 4/643* (2013.01); *H02G 3/06* (2013.01); *H01R 13/655* (2013.01)

(58) Field of Classification Search
CPC .......... H02G 3/22; H02G 3/06; H02G 3/0616; H02G 3/085; H01R 13/648; H01R 13/6585; H01R 4/64; H01R 4/725
USPC ..................... 174/664–666; 439/92
See application file for complete search history.

(56) References Cited

U.S. PATENT DOCUMENTS

| | | |
|---|---|---|
| 5,355,109 A | 10/1994 | Yamazaki |
| D408,790 S | 4/1999 | Kiely et al. |
| 6,840,782 B1 | 1/2005 | Borden et al. |
| 6,881,901 B2 | 4/2005 | Egan |
| 7,078,623 B1 | 7/2006 | Sheehan |
| 7,182,611 B2 | 2/2007 | Borden et al. |
| D626,087 S | 10/2010 | Kiely |
| D633,873 S | 3/2011 | Kiely |

(Continued)

*Primary Examiner* — Hae Moon Hyeon
(74) *Attorney, Agent, or Firm* — Ware, Fressola, Maguire & Barber LLP (57) ABSTRACT

A split grounding bushing for placement on an end of an EMT or a rigid conduit has first and second metal bushing portions forming a ring, a grounding screw extending through the first or second metal bushing portion to make electrical contact with the EMT or rigid conduit, a lug secured to one of the bushing portions, the lug configured to secure a ground conductor thereto, a hinge formed at a second end of the first and second metal bushing portions, so that the first and second bushing portions can be opened or closed, and a removable metallic spacer having a shape that is a section of a cylinder and having an inner smooth surface corresponding to an outer surface of the EMT, the removable spacer also having an outer smooth surface corresponding to an inner surface of the second bushing portion.

27 Claims, 5 Drawing Sheets

(56) References Cited

U.S. PATENT DOCUMENTS

| | | | |
|---|---|---|---|
| 7,901,256 B1 | 3/2011 | Kiely | |
| 7,915,545 B1 | 3/2011 | Bixler et al. | |
| 7,927,157 B1 | 4/2011 | Kiely | |
| D648,281 S | 11/2011 | Cerasale | |
| D651,569 S | 1/2012 | Kiely | |
| 8,106,297 B1 | 1/2012 | Kiely | |
| D657,316 S | 4/2012 | Kiely | |
| 8,231,392 B2 | 7/2012 | Garvin | |
| D666,154 S | 8/2012 | Kiely | |
| 8,410,378 B1 | 4/2013 | Senseney et al. | |
| 8,419,449 B1 | 4/2013 | Smith | |
| D703,519 S | 4/2014 | Senseney et al. | |
| 8,809,680 B2 | 8/2014 | Kiely | |
| D721,652 S | 1/2015 | Smith | |
| D722,966 S | 2/2015 | Smith | |
| 9,000,310 B2 * | 4/2015 | Smith | H02G 3/22 174/650 |
| 9,012,791 B2 * | 4/2015 | Smith | H02G 3/22 174/664 |
| D733,064 S | 6/2015 | Smith | |
| D749,047 S | 2/2016 | Smith | |
| 9,257,795 B2 | 2/2016 | Smith | |
| 2013/0089994 A1 | 4/2013 | Smith | |
| 2013/0133943 A1 * | 5/2013 | Smith | H01R 4/64 174/665 |
| 2014/0339824 A1 | 11/2014 | Kang | |
| 2015/0053476 A1 | 2/2015 | Smith | |
| 2015/0053477 A1 | 2/2015 | Smith | |
| 2016/0240287 A1 | 8/2016 | Thomas | |

* cited by examiner

SPLIT GROUNDING BUSHING WITH REMOVABLE SPACER

CROSS REFERENCE TO RELATED APPLICATION

This application is a continuation-in-part of co-pending patent application Ser. No. 15/584,547 filed on May 2, 2017. This continuation-in-part application is claiming domestic priority under all applicable sections of 35 U.S.C. § 120.

TECHNICAL FIELD

The present invention relates to the field of electrical bushings, specifically threadless split grounding bushings.

BACKGROUND OF THE INVENTION

Bushings are typically installed at the end of an electrical conduit, including electrical metallic tubing (EMT) and rigid conduit. Bushings are installed at the end of such EMT or conduit to prevent electrical conductors within the tubing or conduit from chafing in the region where the conductors exit the tubing or conduit.

Grounding bushings are used so that the tubing or conduit may be grounded or provided with a path to ground as required by various electrical codes.

Split grounding bushings are known in the art which provide a mechanism for attachment of a bushing to a terminating end of a tubing or conduit even when electrical conductors are already installed in the tubing or conduit. This greatly facilitates installation of the bushing especially when additional conductors need to be installed within an existing tubing or conduit.

It is known in the industry that various trade sizes for EMT and rigid conduit ostensibly having the same outer diameter (OD) may nevertheless have significant variations in the OD especially between EMT and rigid conduit having the same trade size, especially for trade sizes of two inches and less. Such EMT and rigid conduit are used in various electrical installations, including in solar panel applications, where the conductors are typically low voltage conductors associated with such solar panels. Various electrical codes require that the EMT or rigid conduit maintain proper grounding and therefore there is a need for grounding bushings, especially of the split type grounding bushings to meet the code requirements for such installations.

Because of OD trade size variation which is seen in the industry for EMT and rigid conduit of two inches or less, there has been a need for a split grounding bushing which can accommodate the variation in the OD for EMT and rigid conduit for the same trade size.

SUMMARY OF THE INVENTION

The present invention relates to a split grounding bushing for placement on an end of an electrical metallic tubing (EMT) or an end of a rigid conduit, comprising a first metal bushing portion forming a first portion of a ring having a first end and a second end, a second metal bushing portion forming a second portion of the ring having a first end and a second end, at least one grounding screw extending through said first or second metal bushing portion positioned to make electrical contact with the EMT or rigid conduit, a lug having an opening, the lug secured to one of the bushing portions, a retaining screw threaded into said lug and extending into the opening so as to secure a ground conductor thereto, a hinge formed at the second end of the first metal bushing portion and the second end of the second metal bushing portion, so that the first end of the first metal bushing portion and the first end of the second metal bushing portion may be opened to extend around the end of the EMT or rigid conduit and then closed, and a removable metallic spacer having a shape that is a section of a cylinder, the removable spacer having an inner smooth surface with a radius of curvature substantially corresponding to a radius of curvature of an outer surface of an EMT so as to electrically bond to the EMT, the removable spacer also having an outer smooth surface corresponding to a radius of curvature of an inner surface of the second metal bushing portion so as to electrically bond to the second metal bushing portion.

Another embodiment of the present invention is the split grounding bushing as described above, wherein the removable spacer includes a post extending from the outer surface of the removable spacer, the post dimensioned for insertion into an aperture formed in the inner surface of the second bushing portion.

Another embodiment of the present invention is the split grounding bushing as described above, wherein the removable spacer further includes a slot formed therein dimensioned for insertion of a tool between the removable spacer and the inner surface of the second bushing portion to assist in removal of the spacer from the second bushing portion.

A further embodiment of the present invention is the split grounding bushing as described above, further including a first insulator portion positioned over an outer terminating end of the first bushing portion and a second insulator portion positioned over an outer terminating end of the second metal bushing portion so as to minimize conductor chafing for conductors emanating out of the EMT or rigid conduit.

A further embodiment of the present invention is the split grounding bushing as described above, wherein the first bushing portion has an inner smooth surface and the inner surface of the second bushing portion is smooth and further wherein the inner smooth surface of the first bushing portion and the inner smooth surface of the second bushing portion are threadless.

Another embodiment of the present invention is the split grounding bushing as described above, wherein the first insulator portion and the second insulator portion are fabricated from plastic.

A further embodiment of the present invention is the split grounding bushing as described above, wherein the lug is secured to an extending member of one of the bushing portions.

A further embodiment of the present invention is the split grounding bushing as described above, wherein the EMT is thin walled.

Another embodiment of the present invention is the split grounding bushing, comprising a first metal bushing portion forming a first portion of a ring having a first end and a second end, a second metal bushing portion forming a second portion of the ring having a first end and a second end, at least one grounding screw extending through said first or second metal bushing portion positioned to make electrical contact with the EMT or rigid conduit, a lug having an opening, the lug secured to one of the bushing portions, a retaining screw threaded into said lug and extending into the opening so as to secure a ground conductor thereto, a hinge formed at the second end of the first metal bushing portion and the second end of the second metal bushing portion, so that the first end of the first metal bushing portion and the first end of the second metal bushing portion may be opened to extend around the end of the EMT or rigid conduit and then closed, and a removable spacer having a shape that is a section of a cylinder, the removable spacer having an inner smooth surface with a radius of curvature substantially corresponding to a radius of curvature of an outer surface of an EMT, the removable spacer also having an outer smooth surface corresponding to a radius of curvature of an inner surface of the second bushing portion, wherein the removable spacer includes a post extending from the outer surface of the removable spacer, the post dimensioned for insertion into an aperture formed in the inner surface of the second bushing portion.

Another embodiment of the present invention is the split grounding bushing as described above, wherein the removable spacer further includes a slot formed therein dimensioned for insertion of a tool between the removable spacer and the inner surface of the second bushing portion to assist in removal of the spacer from the second bushing portion.

A further embodiment of the present invention is the split grounding bushing as described above, further including a first insulator portion positioned over an outer terminating end of the first bushing portion and a second insulator portion positioned over an outer terminating end of the second metal bushing portion so as to minimize conductor chafing for conductors emanating out of the EMT or rigid conduit.

Another embodiment of the present invention is the split grounding bushing as described above, wherein the first bushing portion has an inner smooth surface and the inner surface of the second bushing portion is smooth and further wherein the inner smooth surface of the first bushing portion and the inner smooth surface of the second bushing portion are threadless.

A still further embodiment of the present invention is the split grounding bushing as described above, wherein the first insulator portion and the second insulator portion are fabricated from plastic.

A further embodiment of the present invention is the split grounding bushing as described above, wherein the lug is secured to an extending member of one of the bushing portions.

Another embodiment of the present invention is the split grounding bushing as described above, wherein the EMT is thin walled.

BRIEF DESCRIPTION OF THE DRAWINGS

For a further understanding of the nature and objects of the present invention, reference is made to the following detailed description in conjunction with following drawings in which.

DETAILED DESCRIPTION

Figure 1:
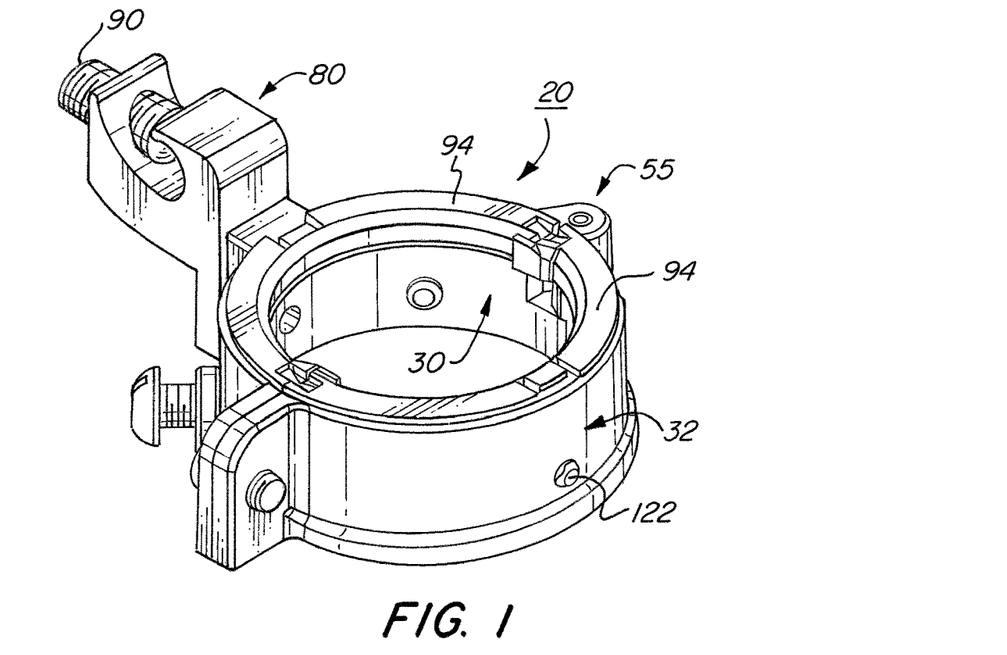
FIG. 1 is a perspective view of an embodiment of a split grounding bushing with a removable spacer according to the present invention, with the split grounding bushing shown in a closed configuration.
Figure 2:
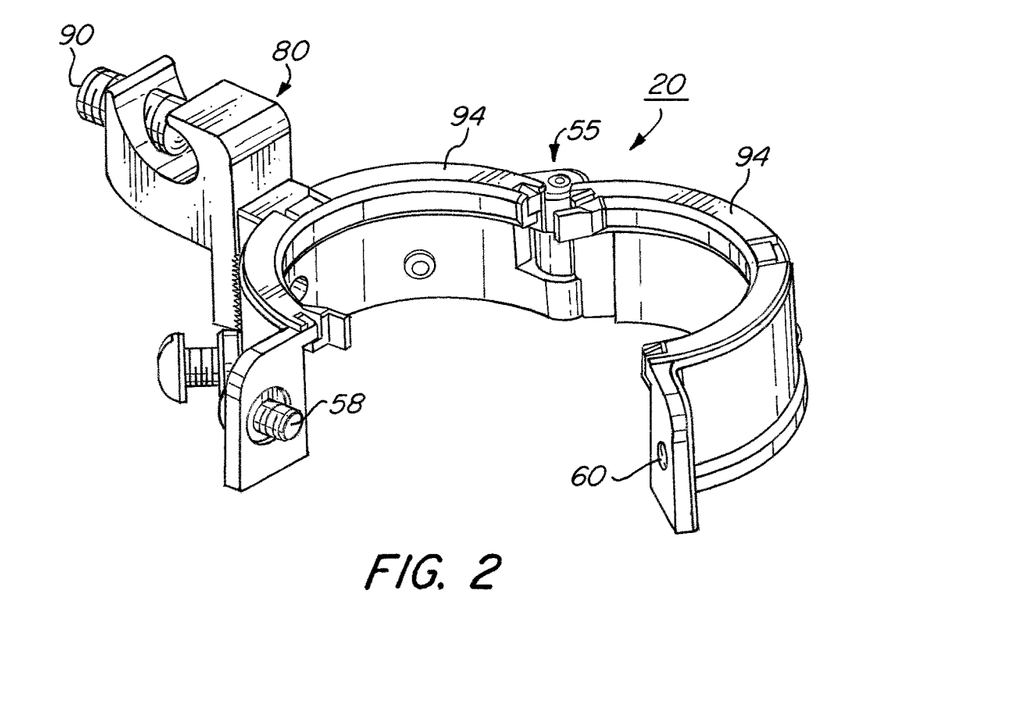
FIG. 2 is a perspective view of the split grounding bushing with removable spacer, with the split grounding bushing shown in an open configuration.
Figures 3, 4:
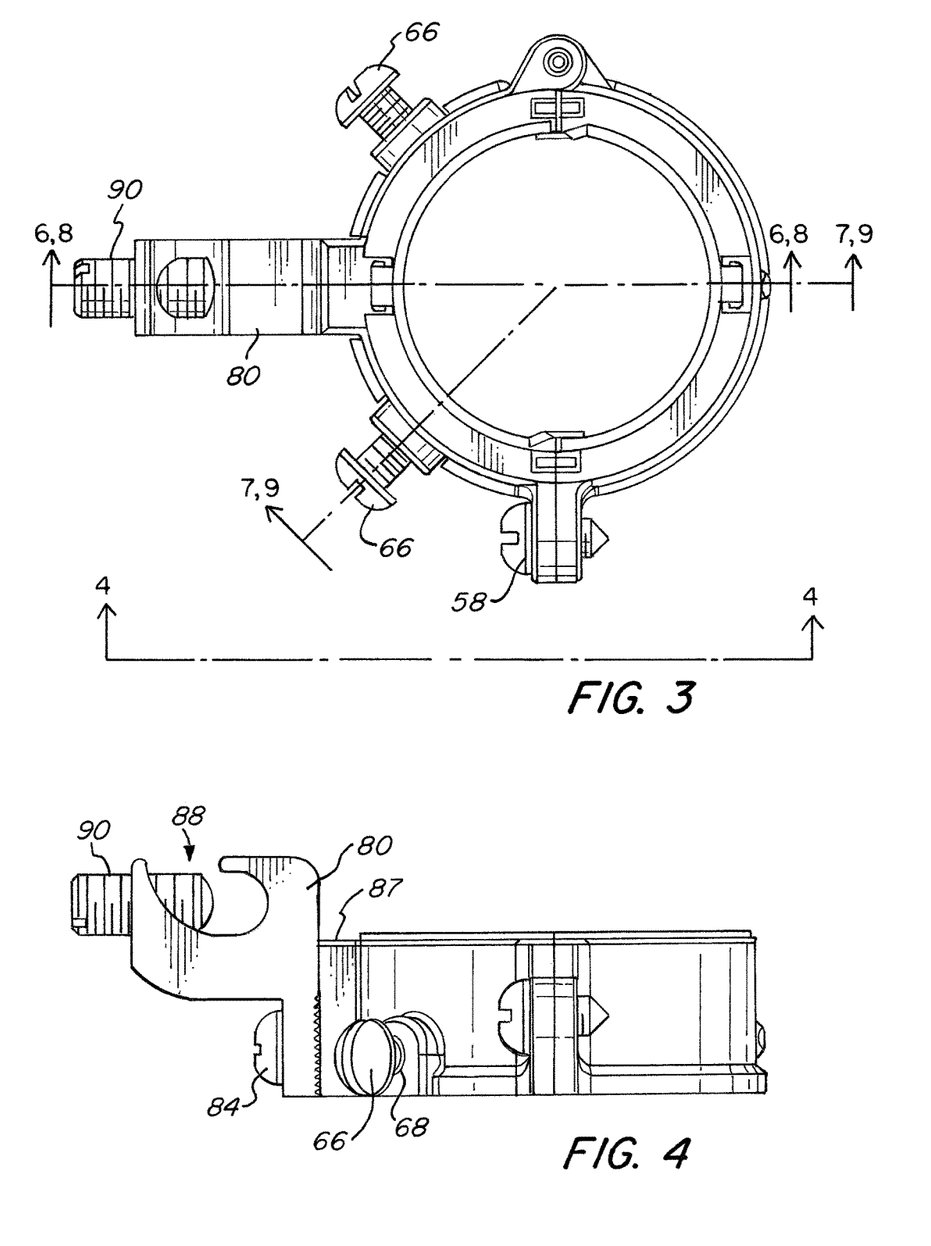
FIG. 3 is a top view of the split grounding bushing as shown in FIGS. 1 and 2, with the split grounding bushing in its closed configuration.
FIG. 4 is a side view of the split grounding bushing taken along line 4-4 of FIG. 3.
Figure 6:
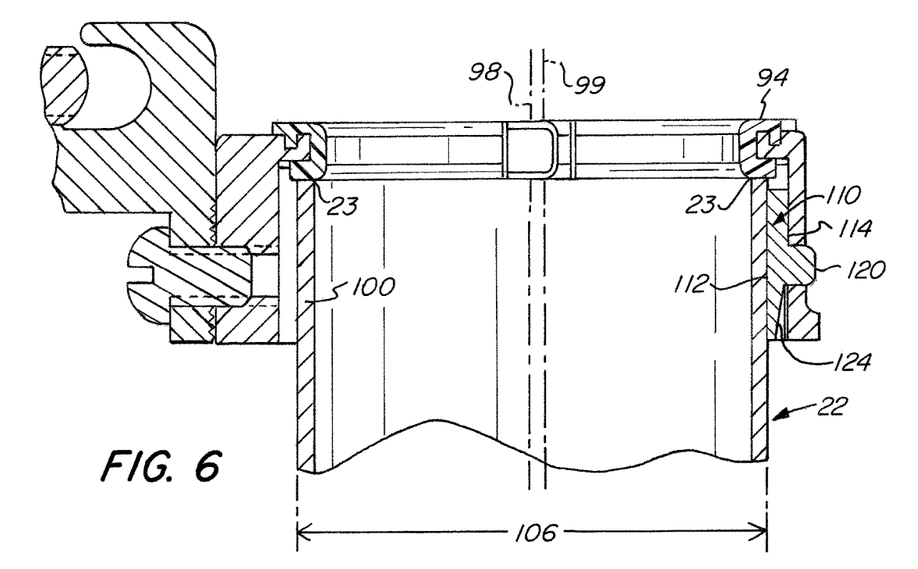
FIG. 6 is a cross-sectional view of the split grounding bushing with removable spacer taken along line 6-6 of FIG. 3, with the split grounding bushing attached to EMT.
Figure 7:
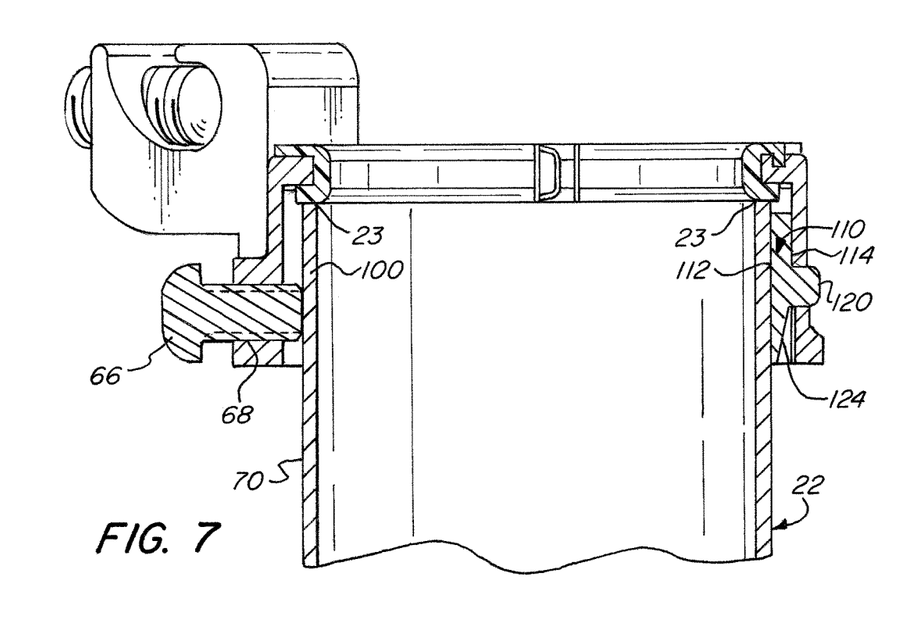
FIG. 7 is a cross-sectional view of the split grounding bushing with removable spacer taken along line 7-7 of FIG. 3, with the split grounding bushing attached to EMT.
Figure 8:
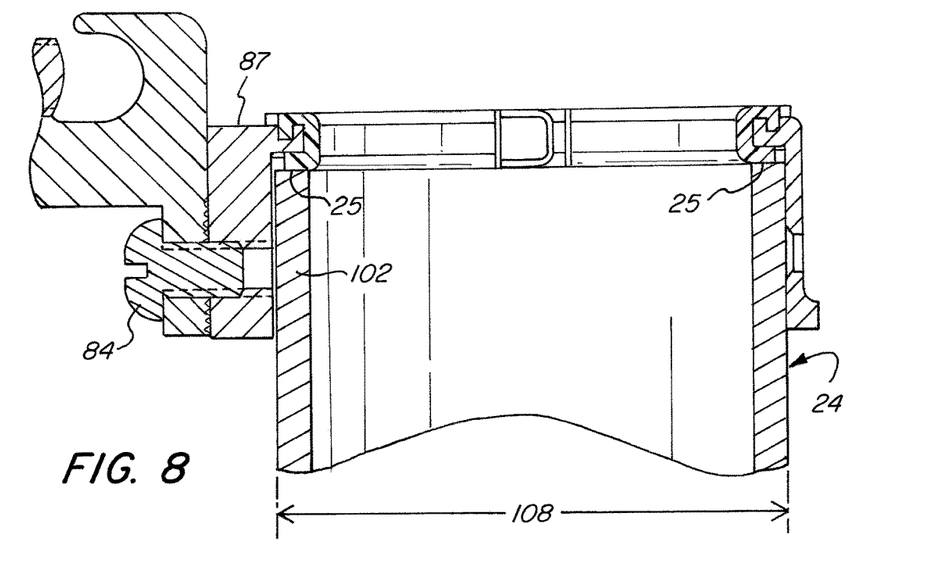
FIG. 8 is a cross-sectional view of the split grounding bushing with removable spacer taken along line 8-8 of FIG. 3, with the split grounding bushing attached to rigid conduit.
Figure 9:
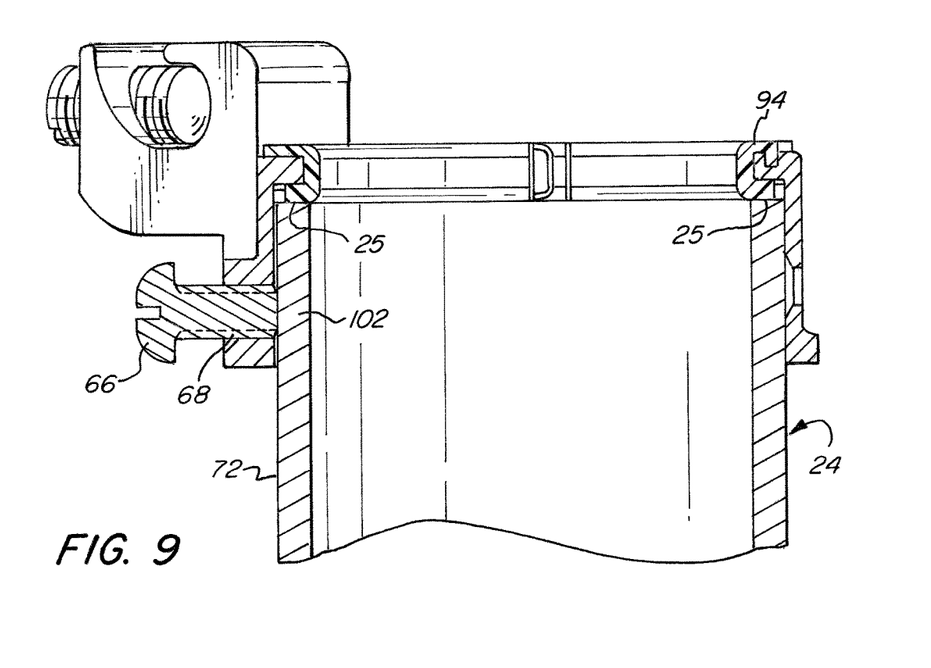
FIG. 9 is a cross-sectional view of the split grounding bushing with removable spacer taken along line 9-9 of FIG. 3, with the split grounding bushing attached to rigid conduit.

As seen in FIGS. 1 and 2, a split grounding bushing 20 according to an embodiment of the present invention is designed for placement on an end 23 of an electrical metallic tubing (EMT) 22 as seen in FIGS. 6 and 7, as well as for placement on an end 25 of a rigid conduit 24 as seen in FIGS. 8 and 9. As with all grounding bushings, the purpose of split grounding bushing 20 is to electrically bond the bushing to the EMT or rigid conduit. It is known in the industry that EMT's are typically thin walled as compared to the wall thickness of comparably sized rigid conduit.

Figures 5, 5A:
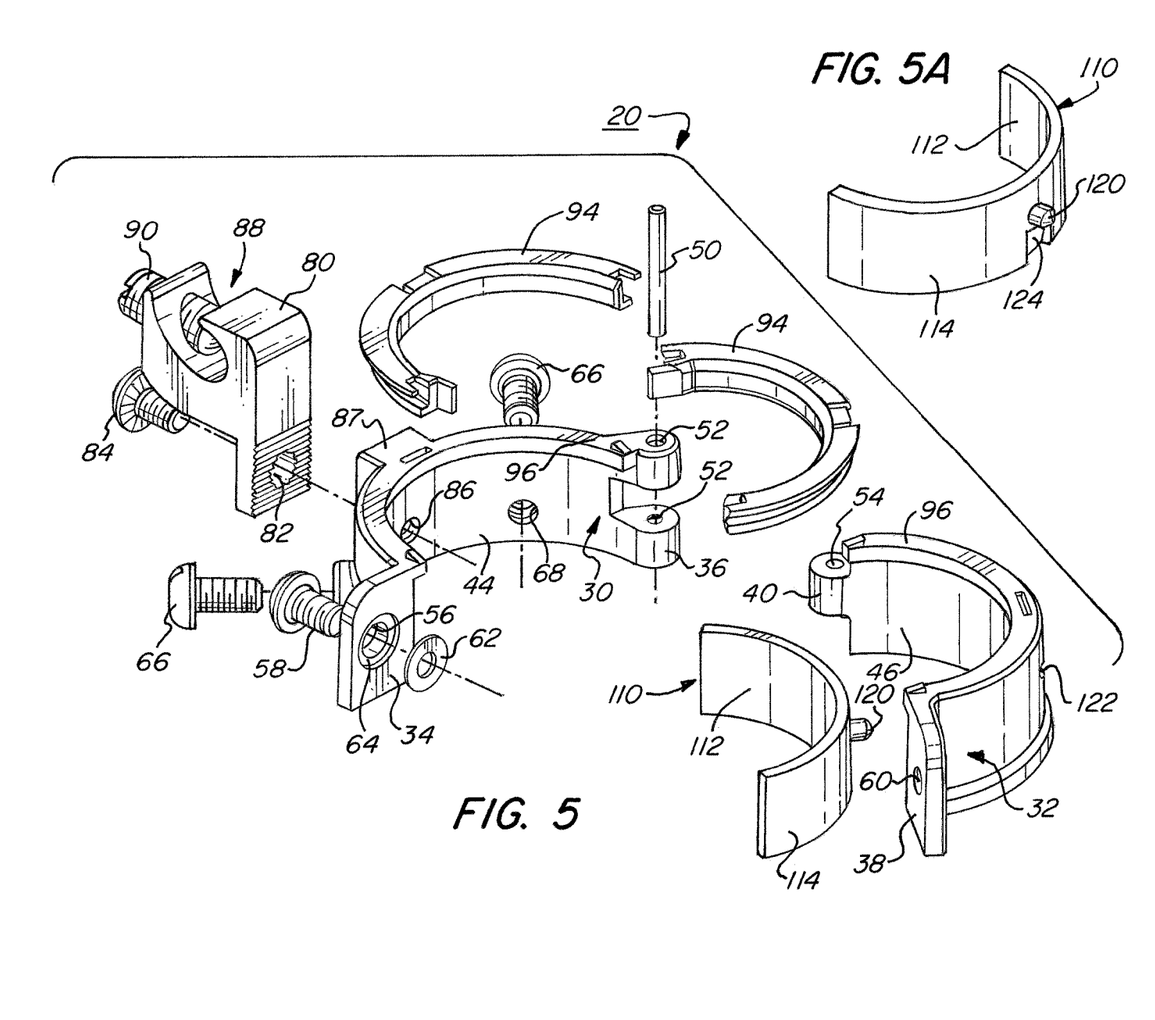
FIG. 5 is an exploded perspective view of the split grounding bushing.
FIG. 5A is a perspective view of a removable spacer forming part of the split grounding bushing.

As seen in FIGS. 1 and 2, the split grounding bushing can be closed (FIG. 1) or opened (FIG. 2). As best seen in FIGS. 1, 2, and 5, the split grounding bushing has a first metal bushing portion 30 and a second metal bushing portion 32, the first metal bushing portion having a first end 34 and a second end 36, while the second metal bushing portion has a first end 38 and a second end 40. The first metal bushing portion and the second metal bushing portion each have a generally semicircular shape. The first metal bushing portion has an inner surface 44 while the second metal bushing portion has an inner surface 46. These inner surfaces 44 and 46 are preferably smooth and threadless. The first metal bushing portion and the second metal bushing portion are preferably fabricated from steel or any suitable electrically conductive metal known in the art.

A hinge pin 50 is attached to the second end of the first metal bushing portion and the second end of the second metal bushing portion by passing through holes 52 formed in the second end of the first metal bushing portion and hole 54 formed in the second end of the second metal bushing portion; thereby forming an overall hinge 55 (see FIGS. 1 and 2). The hinge thereby allows the first and second metal bushing portions to move between the open configuration shown in FIG. 2 and the closed configuration shown in FIG. 1. Other arrangements for pivotal movement can be utilized as known in the art.

The first end 34 of the first metal bushing portion also includes a hole 56 for passage of a fastener 58 for threaded securement into a threaded hole 60 formed in the first end of the second metal bushing portion. A washer 62 may be positioned around fastener 58 for placement within a recess 64 formed in the first end 34 of first metal bushing portion 30. Other types of fastener arrangements could be used as known in the art.

When the split grounding bushing is closed around an end of an EMT or rigid conduit as shown in FIGS. 6-9, one or more grounding screws 66 can be threaded into threaded holes 68 as best seen in FIGS. 3, 5, 7 and 9. The grounding screws when making contact with the surface 70 of EMT 22 or the outer surface 72 of rigid conduit 24, provides low impedance electrical connection between the EMT or rigid conduit and the split grounding bushing.

In many electrical installations such as those associated with low voltage wiring used for solar panels and the like, it is required that the EMT or rigid conduit be grounded. To facilitate this, the split grounding bushing includes a lug 80 with a hole 82 formed therein so as to secure the lug to one of the split grounding bushing portions, such as the first metal bushing portion 30 by means of a fastener 84 threadedly engaging a threaded hole 86 formed in an extending member 87 of the first metal bushing portion 30. The lug includes an opening 88 dimensional for receipt of a grounding conductor (not shown) which is secured to the lug, and thus to the split grounding bushing, by means of a fastener 90 threadedly engaged within a threaded hole passing through the lug as seen in FIGS. 1-5. Although the lug is shown attached to the first metal bushing portion 30, it could also be attached to the second metal bushing portion. Furthermore, although grounding screws 66 are shown in the first metal bushing portion, one or more could instead or in addition be used with an associated threaded hole (not shown) in the second metal bushing portion.

To make the split grounding bushing less likely to chafe outer insulation on conductors passing through the end of the EMT or rigid conduit, first and second insulator portions 94 can be respectively positioned over outer terminating ends 96 of the first and second metal bushing portions as best seen in FIG. 5. FIGS. 1 and 2 show the insulator portions installed on the first and second metal bushing portions, specifically to overlie an outer periphery of the first and second metal bushing portions. These insulator portions thus have a shape corresponding to the outer terminating end of the respective first or second metal bushing portion. The shape of the insulator portions allows the insulator portions to "clip-on" to the corresponding terminating end of the first or second metal bushing portions. The insulator portions may be fabricated from plastic or other suitable insulating material known in the art.

As can best be seen in FIGS. 6 and 7 for an EMT and FIGS. 8 and 9 for a rigid conduit, the EMT typically has a thinner wall thickness 100 as compared to the wall thickness 102 of the rigid conduit 24. It has furthermore been observed that for a specific trade size, such as 2" and smaller OD sizes, the outer diameter 106 of the EMT 22 and the outer diameter 108 of the rigid conduit 24 can vary between themselves (that is, between the OD of an EMT of a particular trade size and a corresponding OD of the rigid conduit for the same trade size), thus making it difficult to use a split grounding bushing of one trade size to accommodate both the OD of the EMT and the OD of the rigid conduit.

The present invention as seen in FIGS. 5, 5A and 6-9 addresses this problem in the art since the split grounding bushing further including a removable spacer 110. This removable spacer when secured to the second metal bushing portion 32 allows the split grounding bushing to make secure contact with the outer surface 70 of the EMT as best seen in FIGS. 6 and 7. Such secure contact ensures electrical bonding of the EMT to the split grounding bushing 20. Thus, removable spacer 110 is typically fabricated from metal, such as zinc alloy.

For placement of the split grounding bushing on a rigid conduit as seen in FIGS. 8 and 9, the removable spacer is removed; thereby allowing the split grounding bushing to accommodate the larger OD of the rigid conduit as compared to the OD of the comparably sized EMT. As best seen in FIGS. 5 and 5A, the removable spacer has a shape that is a section of a cylinder, the removable spacer having an inner smooth surface 112 with a radius of curvature substantially corresponding to the radius of curvature of the outer surface 70 of the EMT (see FIGS. 6 and 7). The removable spacer has an outer smooth surface 114 corresponding to a radius of curvature of an inner surface 46 of the second metal bushing portion 32 (see FIG. 5). Thus, the removable spacer accommodates a space between the outer smooth surface 70 of the EMT and the inner surface 46 of the second metal bushing portion 32; thereby providing a snug fitment of the split grounding bushing onto an end 23 of the EMT as shown in FIGS. 6 and 7, thereby ensuring an electrical bond between the EMT and the split grounding bushing. This arrangement also helps keep the centerline 99 of the bushing on or near the centerline 98 of the EMT while covering the end of the EMT. The shape of the removable spacer can vary as long as it accommodates the space between outer surface 70 of the EMT and inner surface 46 of the second metal bushing portion.

To facilitate securement of the removable spacer 110 to the second metal bushing portion 32, the removable spacer includes a post 120 as best seen in FIGS. 5, 5A, 6 and 7. This post is positioned on the outer smooth surface 114 of the removable spacer so as to pass into an aperture 122 of the second metal bushing portion. The aperture may extend through the second metal bushing portion.

The removable spacer also includes a slot 124 as best seen in FIG. 5A and FIGS. 6 and 7. The slot provides for easy insertion of a tool, such as the blade of a screwdriver (not shown), so as to remove the removable spacer before installation of the split grounding bushing onto a rigid conduit or the like, where the outer diameter of the rigid conduit requires the full diameter of the split grounding bushing in order to secure the grounding bushing to the rigid conduit. This is best seen in FIGS. 8 and 9.

Of course, other means of attaching the removable spacer to the split grounding bushing could be used, such as a press fitment or the like without the use of a post. Variations in the removable spacer can also be made to facilitate removal of the removable spacer from the second grounding bushing portion if desired, such as elimination of the slot and providing for flexible bending of the removable spacer so as to facilitate removal from the second metal bushing portion.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A split grounding bushing for placement on an end of an electrical metallic tubing (EMT) or an end of a rigid conduit, comprising:
   a first metal bushing portion forming a first portion of a ring having a first end and a second end,
   a second metal bushing portion forming a second portion of the ring having a first end and a second end,
   at least one grounding screw extending through said first or second metal bushing portion positioned to make electrical contact with the EMT or rigid conduit,
   a lug having an opening, the lug secured to one of the metal bushing portions,
   a retaining screw threaded into said lug and extending into the opening so as to secure a ground conductor thereto,
   a hinge formed at the second end of the first metal bushing portion and the second end of the second metal bushing portion, so that the first end of the first metal bushing portion and the first end of the second metal bushing portion can be opened to extend around the end of the EMT or rigid conduit and then closed, and
   a removable metallic spacer having a shape that is a section of a cylinder, the removable spacer having an inner smooth surface with a radius of curvature substantially corresponding to a radius of curvature of an outer surface of the EMT so as to electrically bond to the EMT, the removable spacer also having an outer smooth surface corresponding to a radius of curvature of an inner surface of the second metal bushing portion so as to electrically bond to the second metal bushing portion.

2. The split grounding bushing according to claim 1, wherein the removable spacer includes a post extending from the outer surface of the removable spacer, the post dimensioned for insertion into an aperture formed in the inner surface of the second metal bushing portion.

3. The split grounding bushing according to claim 2, wherein the removable spacer further includes a slot formed therein dimensioned for insertion of a tool between the removable spacer and the inner surface of the second metal bushing portion to assist in removal of the spacer from the second metal bushing portion.

4. The split grounding bushing according to claim 3, further including a first insulator portion positioned over an outer terminating end of the first metal bushing portion and a second insulator portion positioned over an outer terminating end of the second metal bushing portion so as to minimize conductor chafing for conductors emanating out of the EMT or rigid conduit.

5. The split grounding bushing according to claim 4, wherein the first metal bushing portion has an inner smooth surface and the inner surface of the second metal bushing portion is smooth and further wherein the inner smooth surface of the first metal bushing portion and the inner smooth surface of the second metal bushing portion are threadless.

6. The split grounding bushing according to claim 2, further including a first insulator portion positioned over an outer terminating end of the first metal bushing portion and a second insulator portion positioned over an outer terminating end of the second metal bushing portion so as to minimize conductor chafing for conductors emanating out of the EMT or rigid conduit.

7. The split grounding bushing according to claim 6, wherein the first insulator portion and the second insulator portion are fabricated from plastic.

8. The split grounding bushing according to claim 2, wherein the first metal bushing portion has an inner smooth surface and the inner surface of the second metal bushing portion is smooth and further wherein the inner smooth surface of the first metal bushing portion and the inner smooth surface of the second metal bushing portion are threadless.

9. The split grounding bushing according to claim 2, wherein the lug is secured to an extending member of one of the bushing portions.

10. The split grounding bushing according to claim 2, wherein the EMT is thin walled.

11. The split grounding bushing according to claim 1, wherein the removable spacer further includes a slot formed therein dimensioned for insertion of a tool between the removable spacer and the inner surface of the second metal bushing portion to assist in removal of the spacer from the second metal bushing portion.

12. The split grounding bushing according to claim 11, further including a first insulator portion positioned over an outer terminating end of the first metal bushing portion and a second insulator portion positioned over an outer terminating end of the second metal bushing portion so as to minimize conductor chafing for conductors emanating out of the EMT or rigid conduit.

13. The split grounding bushing according to claim 12, wherein the first metal bushing portion has an inner smooth surface and the inner surface of the second metal bushing portion is smooth and further wherein the inner smooth surface of the first metal bushing portion and the inner smooth surface of the second metal bushing portion are threadless.

14. The split grounding bushing according to claim 1, further including a first insulator portion positioned over an outer terminating end of the first metal bushing portion and a second insulator portion positioned over an outer terminating end of the second metal bushing portion so as to minimize conductor chafing for conductors emanating out of the EMT or rigid conduit.

15. The split grounding bushing according to claim 14, wherein the first insulator portion and the second insulator portion are fabricated from plastic.

16. The split grounding bushing according to claim 1, wherein the first metal bushing portion has an inner smooth surface and the inner surface of the second metal bushing portion is smooth and further wherein the inner smooth surface of the first metal bushing portion and the inner smooth surface of the second metal bushing portion are threadless.

17. The split grounding bushing according to claim 1, wherein the lug is secured to an extending member of one of the metal bushing portions.

18. The split grounding bushing according to claim 1, wherein the EMT is thin walled.

19. A split grounding bushing for placement on an end of an electrical metallic tubing (EMT) or an end of a rigid conduit, comprising:
   a first metal bushing portion forming a first portion of a ring having a first end and a second end,
   a second metal bushing portion forming a second portion of the ring having a first end and a second end,
   at least one grounding screw extending through said first or second metal bushing portion positioned to make electrical contact with the EMT or rigid conduit,
   a lug having an opening, the lug secured to one of the metal bushing portions, a retaining screw threaded into said lug and extending into the opening so as to secure a ground conductor thereto, a hinge formed at the second end of the first metal bushing portion and the second end of the second metal bushing portion, so that the first end of the first metal bushing portion and the first end of the second metal bushing portion can be opened to extend around the end of the EMT or rigid conduit and then closed, and a removable spacer having a shape that is a section of a cylinder, the removable spacer having an inner smooth surface with a radius of curvature substantially corresponding to a radius of curvature of an outer surface of the EMT, the removable spacer also having an outer smooth surface corresponding to a radius of curvature of an inner surface of the second metal bushing portion;

wherein the removable spacer includes a post extending from the outer surface of the removable spacer, the post dimensioned for insertion into an aperture formed in the inner surface of the second metal bushing portion.

20. The split grounding bushing according to claim 19, wherein the removable spacer further includes a slot formed therein dimensioned for insertion of a tool between the removable spacer and the inner surface of the second metal bushing portion to assist in removal of the spacer from the second metal bushing portion.

21. The split grounding bushing according to claim 20, further including a first insulator portion positioned over an outer terminating end of the first metal bushing portion and a second insulator portion positioned over an outer terminating end of the second metal bushing portion so as to minimize conductor chafing for conductors emanating out of the EMT or rigid conduit.

22. The split grounding bushing according to claim 21, wherein the first metal bushing portion has an inner smooth surface and the inner surface of the second metal bushing portion is smooth and further wherein the inner smooth surface of the first metal bushing portion and the inner smooth surface of the second metal bushing portion are threadless.

23. The split grounding bushing according to claim 19, further including a first insulator portion positioned over an outer terminating end of the first metal bushing portion and a second insulator portion positioned over an outer terminating end of the second metal bushing portion so as to minimize conductor chafing for conductors emanating out of the EMT or rigid conduit.

24. The split grounding bushing according to claim 23, wherein the first insulator portion and the second insulator portion are fabricated from plastic.

25. The split grounding bushing according to claim 19, wherein the first metal bushing portion has an inner smooth surface and the inner surface of the second metal bushing portion is smooth and further wherein the inner smooth surface of the first metal bushing portion and the inner smooth surface of the second metal bushing portion are threadless.

26. The split grounding bushing according to claim 19, wherein the lug is secured to an extending member of one of the metal bushing portions.

27. The split grounding bushing according to claim 19, wherein the EMT is thin walled.

* * * * *